Jan. 10, 1928.
J. G. ROACH
1,655,844
SIMPLIFIED HYDRAULIC BRAKE
Filed May 21, 1925   2 Sheets-Sheet 1
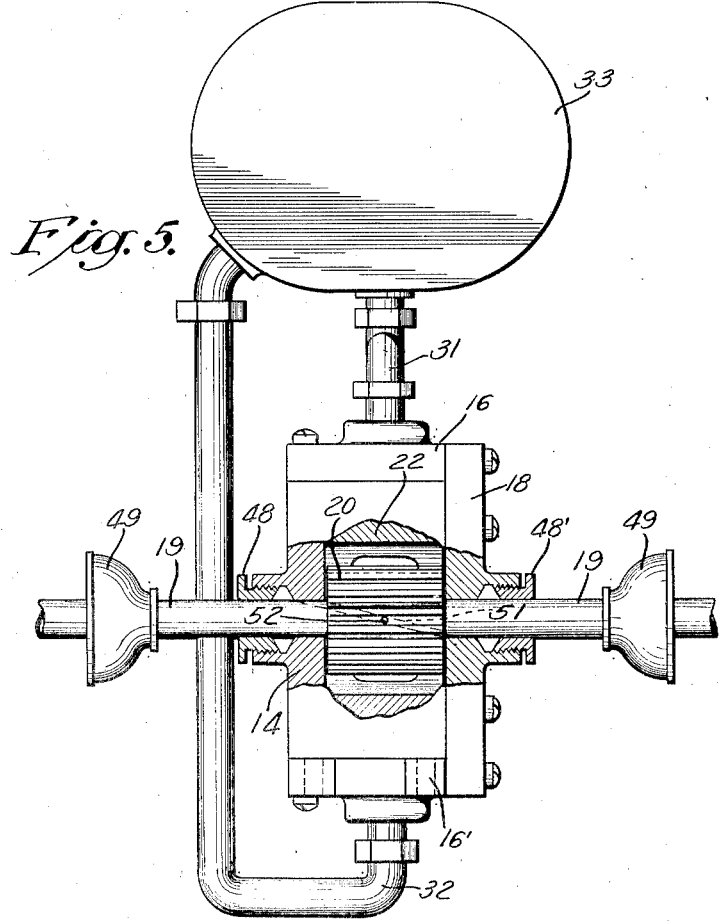
Fig. 5.
Fig. 1.
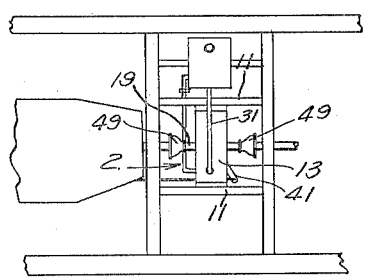
INVENTOR
JESSE G. ROACH
BY
ATTORNEY Jan. 10, 1928.
J. G. ROACH
1,655,844
SIMPLIFIED HYDRAULIC BRAKE
Filed May 21, 1925 2 Sheets-Sheet 2
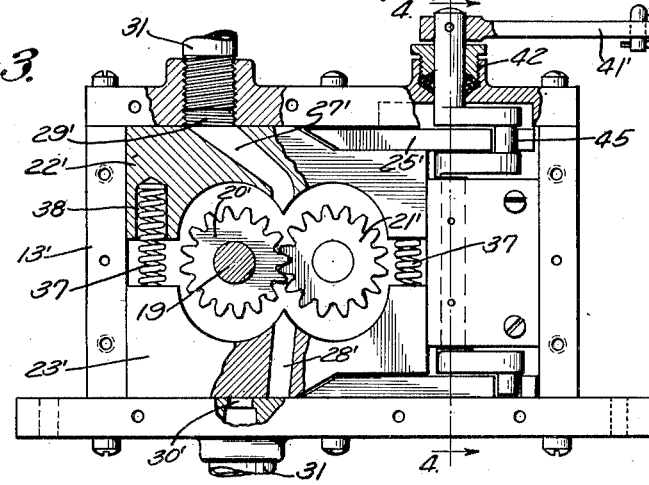
INVENTOR
JESSE G. ROACH
BY
ATTORNEY Patented Jan. 10, 1928.

1,655,844

UNITED STATES PATENT OFFICE.

JESSE G. ROACH, OF LOS ANGELES, CALIFORNIA.

SIMPLIFIED HYDRAULIC BRAKE.

Application filed May 21, 1925. Serial No. 31,755.

My present invention is a hydraulic brake comprising relatively few movable parts, not liable to derangement, but nevertheless capable of a braking effect so powerful and so readily controllable as to adapt the same to a great variety of uses.

It is an object of this invention to provide, in a hydraulic brake suitable for use upon trucks and other motor vehicles and elsewhere, simple and reliable means utilizing the principle of the gear pump in producing a braking effect; and preferred embodiments of my invention may comprise not only a pair of gears within a substantially rectangular housing and constantly in mesh and normally rotating, but also relatively movable means such as slidable blocks adapted to so define a pump chamber as to predetermine the pumping effect of said gears.

It is a further object of this invention to provide a hydraulic pump comprising chamber-defining blocks whose form adapts the same to be easily and accurately machined and fitted and to be confined in a housing through which oil, or another substantially incompressible fluid, may be permitted to flow under complete control; and, in a preferred embodiment of my invention, the said slidable chamber-defining members may be resiliently pressed apart and may be so shaped and guided that additional slidable elements, hereinafter referred to as sliding wedges or valve elements, may be employed to cam the same from outer positions to inner positions; and the said sliding wedges and the mentioned cooperating parts may be so proportioned that the first effect of a relative movement, such as may be imparted by cranks projecting into slots in said wedges, may be the shifting of said chamber-defining blocks to an inner position, thereby providing a pump chamber with whose sides said gears may contact, any continued movement of the wedges being thereafter effective to close a port or ports by which oil, or the like, may be admitted to or permitted to exit from said pump chamber.

It is a further object of this invention to provide a brake organization including a crank or cranks rigidly connected with a rock shaft extending into or through the mentioned housing; and, in a perferred embodiment of my invention, this rock shaft may be provided with split bearings together constituting a filler block adapted to serve also as a means for the retention and guidance of said chamber-defining blocks.

It is an object of my invention to provide a hydraulic brake adapted to be easily interposed in a longitudinal drive shaft, such as the drive shaft of a Mack truck, or the like, and to be readily controlled by means such as a usual brake pedal or lever.

Other objects of my invention will appear from the following description of an advantageous embodiment thereof, taken in connection with the appended claims and the accompanying drawings, in which Fig. 1 is a diagrammatic plan view showing a truck frame provided with an amid-ships transmission and with an embodiment of my invention interposed in a drive shaft extending rearwardly therefrom.

Fig. 2 may be regarded as an elevational view, on an enlarged scale, with a cover plate removed and with parts broken away, this view being taken from the direction indicated by the arrow 2 of Fig. 1.

Fig. 3 corresponds generally to Fig. 2, but illustrates optional modifications hereinafter referred to and shows the interior parts as in an "off" rather than an "on" position.

Fig. 4 is a view taken substantially as indicated by the line 4—4 of Fig. 3, with a part broken away.

Fig. 5 is a view taken from the direction of the arrow 5 of Fig. 2, with parts broken away, but omitting frame parts and illustrating certain additional or optional details of construction and arrangement hereinafter referred to, the interior parts being shown in an off position, as in Fig. 3.

Referring to the details of that form of my invention illustrated in Figs. 1, 2 and 5, 11 may be longitudinally-extending supporting elements of any preferred configuration, to which may be attached, as by means of bolts 12, a main body or gear housing 13, the main or base plate 14 of which may be integrally or otherwise rigidly secured to end elements 15, 15', to which side elements 16, 16' may be secured by screws 17, or the like. This main body or gear housing may be completed by a removable cover plate 18; and both the base plate 14 and the cover plate 18, or their equivalents, may be provided with bearings for a driven shaft 19, extending therethrough.

Assuming that this shaft 19 is the element whose rotation is to be controlled I may provide the same, within the housing 13, with a gear 20 of suitable dimensions and of a form adapting it to cooperate with a second gear 21, constantly intermeshing therewith, to operate as a gear pump. To provide a pump chamber for the mentioned gears, I may employ means such as a pair of sliding blocks 22, 23, corresponding in thickness to the distance between the plates 14 and 18 and respectively provided with pairs of arcuate or parti-cylindrical concavities 24, engageable by the mentioned gears and adapted to cooperate in the defining of the pump chambers. Preferably, both of the mentioned blocks 22, 23, or their equivalents, are slidable by means such as cam wedges 25, 26; and they may be provided, as at 27, 28, with passages through which fluid may be introduced or forced by way of ports 29, 30,—shown as provided in the respective side plates 16, 16' and as connected, by means of pipes 31, 32 with a tank 33 (Fig. 5), adapted to contain oil, or the like.

The cam wedges 25, 26 may normally rest in depressions 34, 34', provided in the outer faces of the sliding blocks 22, 23; and cam faces 35, 35' of said blocks may be adapted to engage correspondingly inclined cam faces 36, 36' upon said sliding blocks, to shift the same from an outer or inoperative position such as that illustrated in Fig. 3, to an inner or pumping position, such as that illustrated in Fig. 2. The blocks 22 and 23 may be normally pressed apart by means such as compression springs 37, seated in depressions 38 (Fig. 3); and it is a unique feature of my invention that the cam wedges or plates 25, 26 are adapted to serve also as valve elements, being preferably so proportioned and so positioned that the described camming action, forcing the blocks 22, 23 into their inner positions, precedes the closing of the respective ports 29, 30. Thus the first effect of a shifting of the cam wedges 25, 26 is the rendering of the gears 20, 21 operative for a pumping effect, these gears being constantly submerged in oil, or the like; and the braking effect which results from the described pumping may thereafter be very perfectly controlled by the further advance of the wedges 25, 26, or their equivalents, in such direction as to close an exit port, or both an inlet and an inlet and an exit port, such as one or both of the ports 29, 30, optionally offset.

Although any preferred means might be employed to advance the sliding wedges 25, 26, and to withdraw the same, I suggest the employment, for this purpose, of cranks 39, 39', shown as integral with one another and with a shaft 40, movable by an arm or lever 41,—this shaft being shown as provided at 42 with a gland and as retained by a split bearing comprising a block 43, secured by screws 44 and serving as a guide for one end of the chamber-defining blocks 22, 23—the opposite ends thereof being in contact with and guided by the end plate 15. As shown in Figs. 2 and 3, the cranks 39, 39' are adapted to enter slots 45 in the respective slidable cam plates 25, 26; and the cooperating parts are so proportioned that the mentioned blocks move inward, when my brake is applied, in time to permit the arms 46 to rotate in the spaces 34, 34', after the sliding wedges 25, 26 are suitably advanced.

If desired, as shown in Fig. 3, inlet port 29', communicating with a more steeply inclined inlet passage 27', extending through a slidable block 22', may be so positioned as never to be closed by a cam wedge 25'; but, for most uses, I may prefer the construction illustrated in Figs. 2 and 5,—placing the tank 33 in all cases at a sufficient elevation to assure a satisfactory flow of oil, or the like, in either direction to a pump chamber formed as above. So far as the principles of my invention are concerned it may obviously be regarded as immaterial whether the operating arm or lever 41 (or 41'), Fig. 3, is positioned above or below the housing 13 (or 13'), and immaterial also whether I employ means such as a fixed stop 47, to prevent over-throw of the mentioned arms or levers, and outlet 30' may be offset relatively to passage 28'.

It will be understood that the shaft 19, or its equivalent, extending entirely through the housing 13 and carrying the gear 20, may be provided with glands 48, 48', and with any suitable means, such as universal joint couplings 49, for securing the same in a driven shaft; whereas the shaft 50, when this shaft is not a mere pin or stub integral with plate 14 or plate 18, need in no event extend through the mentioned plates; and either or both of the mentioned plates may advantageously be provided with lubricating channels of the general character illustrated in Fig. 5. That is to say, a continuous or discontinuous diagonal passage or passages 51 may communicate with a bore 52, extending inwardly from between teeth of one or both of the mentioned gears in such manner that, incidentally to the rotation and intermeshing thereof, oil, in quantity sufficient for effective lubrication, may be forced inwardly through the bore 52 and therefrom through passages 51, to the bearings of one or both of the mentioned shafts.

The arms or levers 41 (41') may be manipulated by means such as a pedal or lever connected therewith, as by means of a link or reach rod; and it will be obvious that the direction in which oil is forced depends upon the direction of rotation of the gears 20, 21 (or 20', 21'); but my brakes may be employed very effectively to control a rotation in either direction; and the withdrawal of the described cam wedges is immediately effective to permit free rotation of the shaft 19, or its equivalent, by reason of the prompt separation of the blocks 22, 23 (or 22', 23') under the action of the mentioned springs. It will however be appreciated that several of the features above described may be of minor importance; and that equivalent lubricating and operating details may be substituted for those mentioned.

Although I have herein described alternative embodiments of my invention, it should be understood that various features thereof can be independently used, and also that numerous modifications might be made by those skilled in the art to which this case relates, without the slightest departure from the spirit and scope of this invention, as the same is indicated above and in the following claims.

I claim as my invention:

1. A hydraulic brake comprising: a housing through which extends a shaft whose rotation is to be controlled; a pair of gears rotatable by said shaft and adapted to serve as a gear pump; transversely slidable chamber-defining blocks relatively movable in said housing; and means for imparting relative movement to said blocks.

2. A hydraulic brake of the general character defined in claim 1 in which said blocks correspond in thickness to an interior dimension of said housing and are guided between plates comprised therein.

3. A hydraulic brake of the general character defined in claim 1 in which said blocks are provided on one face with a pair of cylindrical concavities adapted to interfit with said gears.

4. A hydraulic brake of the general character defined in claim 1 in which said blocks are provided on one face with a pair of cylindrical concavities adapted to interfit with said gears, an opposite face of one of said blocks being engageable by a slidable cam wedge.

5. A hydraulic brake of the general character defined in claim 1 in which one of said gears is secured to said shaft, and at least one of said blocks is provided with a fluid passage therethrough.

6. A hydraulic brake comprising: a gear housing; pump gears rotatable in said housing; slidable blocks movable in said housing,—to vary a pump chamber containing said gears; and slidable cams adapted to advance said blocks.

7. A hydraulic brake of the general character defined in claim 6 in which said cams are adapted to serve also as valve elements.

8. A hydraulic brake of the general character defined in claim 6 in which said cams are adapted to serve also as valve elements effective first to advance said blocks and then to close ports of a pump chamber.

9. A hydraulic brake of the general character defined in claim 6 in which said cams are movable by cranks.

In testimony whereof, I have hereunto set my hand at Los Angeles, California, this 14th day of May, 1925.

JESSE G. ROACH.